US011237047B2

(12) United States Patent
Imoto et al.

(10) Patent No.: US 11,237,047 B2
(45) Date of Patent: Feb. 1, 2022

(54) OPTICAL MEASUREMENT DEVICE, OPTICAL MEASUREMENT METHOD, AND SCANNING MICROSCOPE

(71) Applicant: OLYMPUS CORPORATION, Tokyo (JP)

(72) Inventors: Kentaro Imoto, Tokyo (JP); Makoto Ishikake, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 74 days.

(21) Appl. No.: 16/819,406

(22) Filed: Mar. 16, 2020

(65) Prior Publication Data

US 2020/0217716 A1 Jul. 9, 2020

Related U.S. Application Data

(63) Continuation of application No. PCT/JP2018/015495, filed on Apr. 13, 2018.

(30) Foreign Application Priority Data

Sep. 20, 2017 (WO) .................. PCT/JP2017/033816

(51) Int. Cl.
*G01J 1/44* (2006.01)
*G01T 1/24* (2006.01)
*G01J 1/04* (2006.01)
*G01N 21/27* (2006.01)
*G01T 1/29* (2006.01)

(52) U.S. Cl.
CPC . *G01J 1/44* (2013.01); *G01J 1/04* (2013.01); *G01N 21/27* (2013.01); *G01T 1/24* (2013.01);
(Continued)

(58) Field of Classification Search
CPC .................. G01J 2001/442; G01J 1/44; G01J 2001/4466; G01J 2001/04; G01T 1/24; G01T 2001/2964; G01N 21/27
See application file for complete search history.

(56) References Cited

U.S. PATENT DOCUMENTS 8,314,405 B2 * 11/2012 Kim .................. G01N 21/6408
250/458.1
2011/0042573 A1 2/2011 Kim et al.
(Continued)

FOREIGN PATENT DOCUMENTS

EP 2293110 A2 3/2011
FR 2572522 A1 5/1986
(Continued)

OTHER PUBLICATIONS

International Search Report dated Dec. 12, 2017 issued in International Application No. PCT/JP2017/033816, together with a partial English language translation.
(Continued)

*Primary Examiner* — David P Porta
*Assistant Examiner* — Fani Boosalis
(74) *Attorney, Agent, or Firm* — Scully, Scott, Murphy & Presser, P.C.

(57) ABSTRACT

An optical measurement device includes: an optical sensor that detects pulsed signal light and that outputs a detection signal formed of an exponential-function response; an A/D converter that samples the detection signal output from the optical sensor and that converts the detection signal into a digital signal; and a processor comprising hardware, the processor being configured to subject the digital signal output from the A/D converter to inverse transformation by using a multiple diagonal matrix, thus calculating an estimated pulse of the signal light.

19 Claims, 6 Drawing Sheets

(52) U.S. Cl.
CPC ....... *G01T 1/2964* (2013.01); *G01J 2001/442* (2013.01); *G01J 2001/4466* (2013.01)

(56) References Cited

U.S. PATENT DOCUMENTS

| | | |
|---|---|---|
| 2013/0114073 A1 | 5/2013 | Namba et al. |
| 2016/0003671 A1 | 1/2016 | Fontbonne et al. |
| 2016/0349380 A1 | 12/2016 | Shirahama et al. |
| 2017/0030769 A1 | 2/2017 | Clemens et al. |

FOREIGN PATENT DOCUMENTS

| | | |
|---|---|---|
| JP | S64-088390 A | 4/1989 |
| JP | 2001-004445 A | 1/2001 |
| JP | 2002-107300 A | 4/2002 |
| JP | 2004-144734 A | 5/2004 |
| JP | 2011-043501 A | 3/2011 |
| JP | 2012-037267 A | 2/2012 |
| JP | 2012-060012 A | 3/2012 |
| JP | 2016-516179 A | 6/2016 |
| JP | 2016-225876 A | 12/2016 |
| JP | 2017-026615 A | 2/2017 |
| WO | 2017/082218 A1 | 5/2017 |

OTHER PUBLICATIONS

International Search Report dated Jul. 10, 2018 issued in International Application No. PCT/JP2018/015495, together with a partial English language translation.

\* cited by examiner

OPTICAL MEASUREMENT DEVICE, OPTICAL MEASUREMENT METHOD, AND SCANNING MICROSCOPE

CROSS-REFERENCE TO RELATED APPLICATIONS

This is a continuation of International Application PCT/JP2018/015495, with an international filing date of Apr. 13, 2018, which is hereby incorporated by reference herein in its entirety.

TECHNICAL FIELD

The present invention relates to an optical measurement device, an optical measurement method, and a scanning microscope.

BACKGROUND ART

In the related art, as an optical measurement device that measures faint light, there is a known optical measurement device that performs photon counting by applying threshold processing to a signal detected by an optical sensor, such as a photomultiplier tube (for example, see PTL 1). This optical measurement device of PTL 1 presupposes that a photomultiplier tube, which has a relatively fast sensor response, is used.

CITATION LIST

Patent Literature

Japanese Unexamined Patent Application, Publication No. 2001-4445

SUMMARY OF INVENTION

One aspect of the present invention is directed to an optical measurement device including: an optical sensor unit that detects pulsed signal light and that outputs a detection signal formed of an exponential-function response; an A/D converter that samples the detection signal output from the optical sensor unit and that converts the detection signal into a digital signal; and a processor comprising hardware, the processor being configured to subject the digital signal output from the A/D converter to inverse transformation by using a multiple diagonal matrix, thus calculating an estimated pulse of the signal light.

Another aspect of the present invention is directed to an optical measurement method including: detecting pulsed signal light by means of a semiconductor optical sensor and outputting a detection signal formed of an exponential-function response; sampling the output detection signal and converting the detection signal into a digital signal; and calculating an estimated pulse of the signal light by subjecting the digital signal, which is obtained through the conversion, to inverse transformation by using a multiple diagonal matrix.

Another aspect of the present invention is directed to a scanning microscope including: a scanner that scans, on a sample, illumination light emitted from a light source; an optical system that focuses, on the sample, the illumination light scanned by the scanner and that collects the signal light generated at each scanning position in the sample, at which the illumination light is scanned; one of the above-described optical measurement devices that calculate the estimated pulse of the signal light collected by the optical system; and an image reconstruction unit that reconstructs an image of the sample on a basis of the estimated pulse calculated by the optical measurement device.

DESCRIPTION OF EMBODIMENTS

An optical measurement device 5, an optical measurement method, and a scanning microscope 1 according to one embodiment of the present invention will be described below with reference to the drawings.

Figure 1:
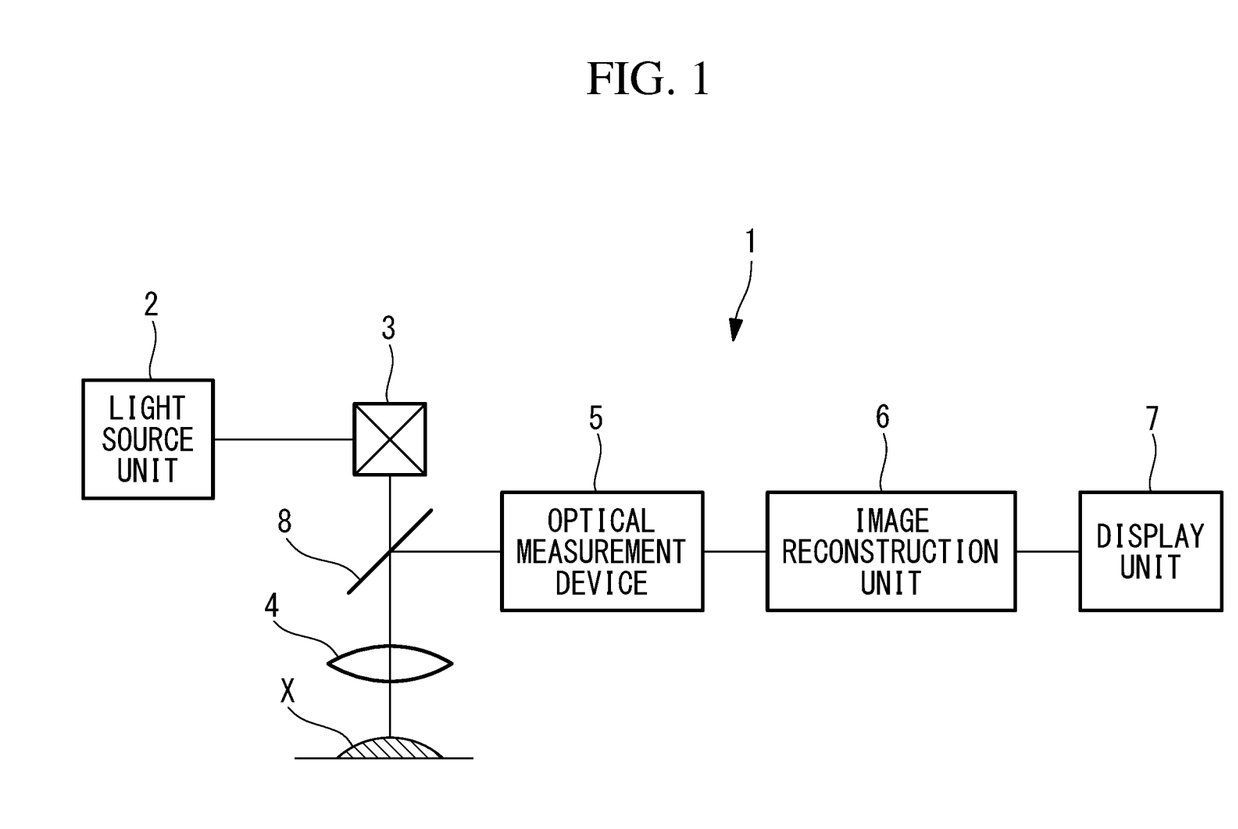
FIG. 1 is a view showing the overall configuration of a scanning microscope according to one embodiment of the present invention.

As shown in FIG. 1, the scanning microscope 1 of this embodiment includes: a light source unit (light source) 2 that generates ultrashort-pulse laser light (illumination light); a scanner (scanning unit) 3 that two-dimensionally scans the laser light generated by the light source unit 2; an optical system 4 that focuses the laser light scanned by the scanning unit 3 on a sample X and collects fluorescence (signal light) generated in the sample X; the optical measurement device 5 of this embodiment, which detects the fluorescence collected by the optical system 4 and which calculates an estimated pulse; an image reconstruction unit 6 that generates an image of the sample X on the basis of the estimated pulse calculated by the optical measurement device 5; and a display unit 7 that displays the generated image.

The scanner 3 is, for example, a proximity galvanometer mirror in which two galvanometer mirrors are disposed close to each other.

In the figure, reference sign 8 is a dichroic mirror that transmits the laser light and that reflects the fluorescence.

Figure 2:
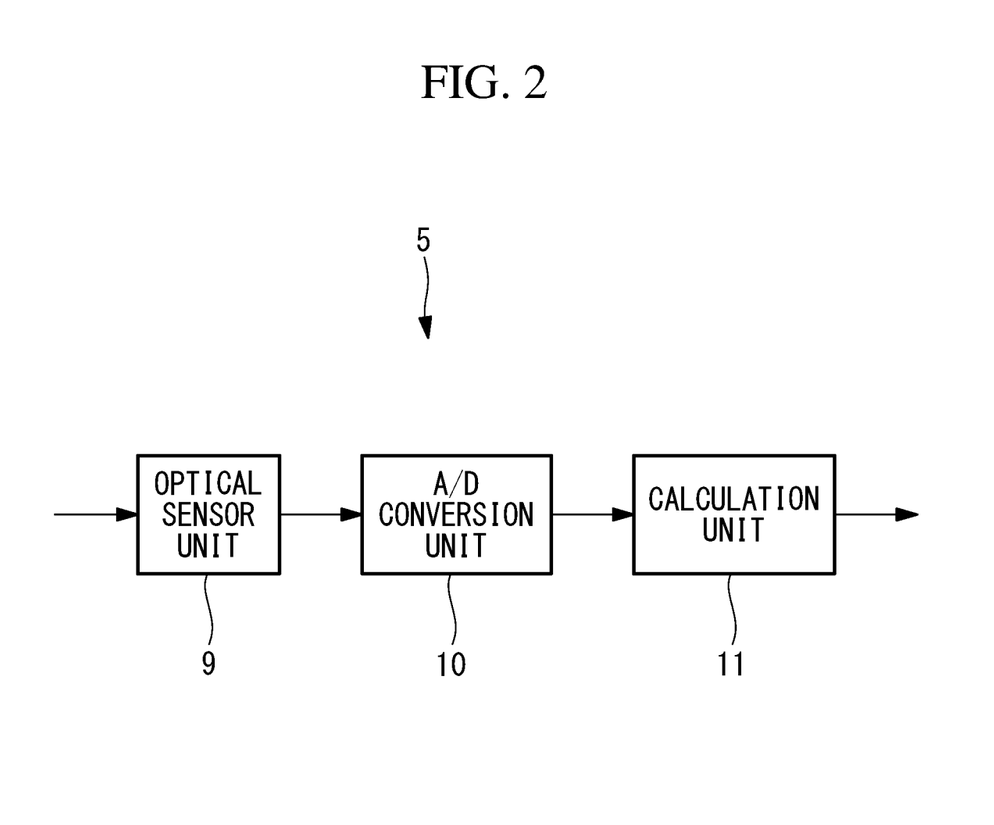
FIG. 2 is a block diagram showing an optical measurement device according to one embodiment of the present invention, included in the scanning microscope shown in FIG. 1.

As shown in FIG. 2, the optical measurement device 5 of this embodiment includes: an optical sensor unit 9 that detects pulsed fluorescence generated when the laser light is radiated on a fluorescent substance present in the sample X; an A/D conversion unit 10 that converts a detection signal output from the optical sensor unit 9 into a digital signal; and a calculation unit 11 that calculates an estimated pulse of the signal light from the digital signal output from the A/D conversion unit 10.

The optical sensor unit 9 includes a sensor (not shown) and an amplifier (not shown) that is disposed in a stage after the sensor. The optical sensor unit 9 detects pulsed fluorescence and outputs a detection signal that is formed of an exponential-function response having a fixed time constant. The sensor is, for example, a semiconductor optical sensor formed by arraying a plurality of avalanche photodiodes that are operated in a Geiger mode.

Figure 3:
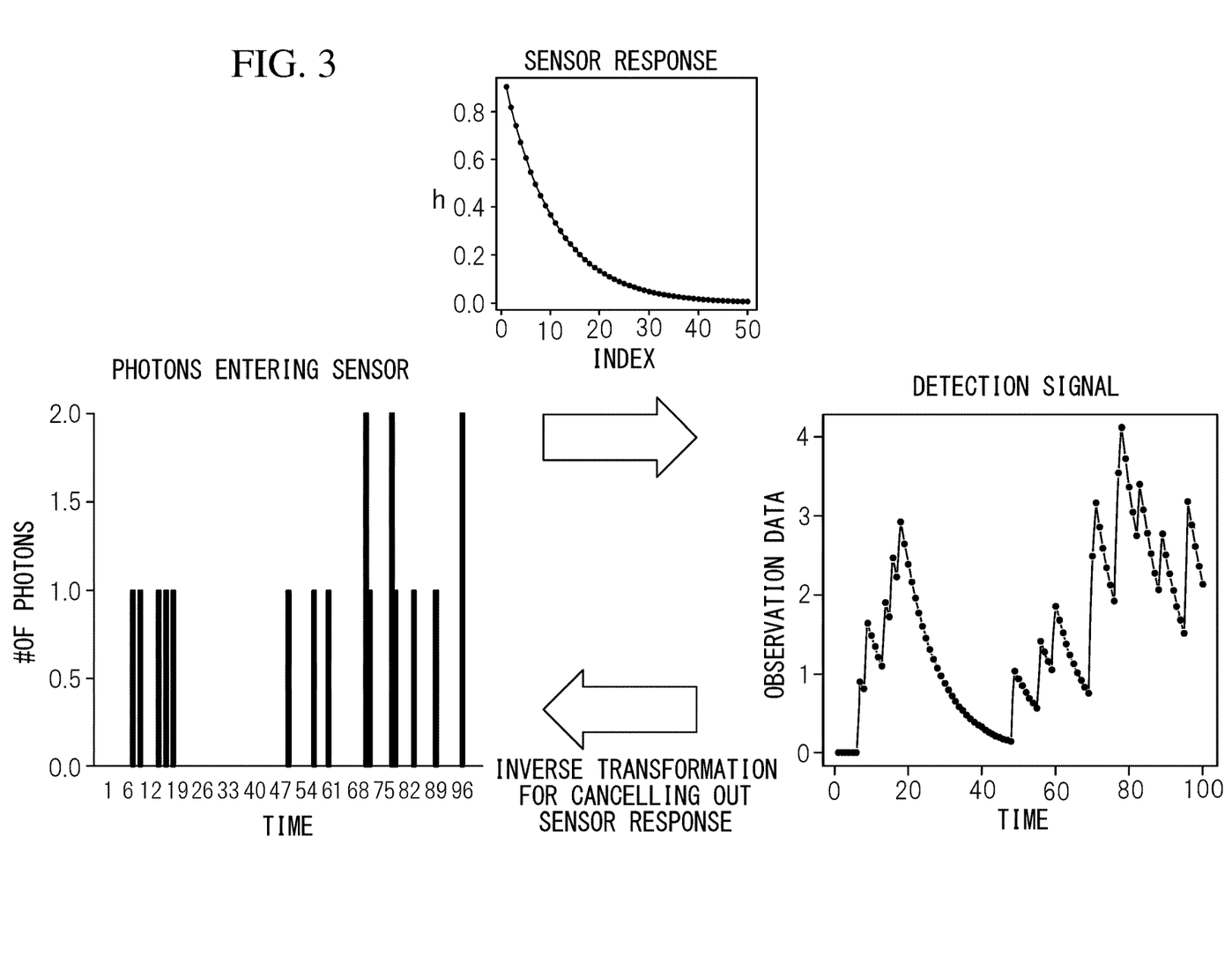
FIG. 3 is a view showing the relationship among photons entering an optical sensor unit, the sensor response, and detection signals.

FIG. 3 shows an example of photons entering the optical sensor unit 9, an example exponential function that indicates the response of the optical sensor unit 9, and example detection signals output from the optical sensor unit 9.

The A/D conversion unit 10 samples a detection signal output from the optical sensor unit 9 in a sampling period shorter than the longest time constant in the exponential-function response of the optical sensor unit 9.

As shown in FIG. 3, the calculation unit 11 subjects the detection signal output from the optical sensor unit 9 to inverse transformation, i.e., Z-transform, for cancelling out the response of the optical sensor unit 9. The transformation matrix for the Z-transform is formed on the basis of data obtained after A/D conversion is applied to an impulse response of the optical sensor unit 9. Because the impulse response of the optical sensor unit 9 is known, the transformation matrix for the Z-transform can be obtained in advance.

Specifically, an output y(n) and an input x(n) of the optical sensor unit 9 can be expressed as in Expression 1 by using a transfer function h(n) and can be expressed as in Expression 2 by using a transformation matrix. In this embodiment, although Expression 2 has the same length as the number n of input data items, a part (5×5) of them is extracted and explained here. Expression 2 actually shows n column= (n*n) matrix*n column, and the signal is extracted therefrom for explanation.

$$y[n] = \sum_{i=0}^{n} h[n-i] \cdot x[i] \quad \{\text{Expression 1}\}$$

$$\begin{pmatrix} y_0 \\ y_1 \\ y_2 \\ y_3 \\ y_4 \end{pmatrix} = \begin{pmatrix} h_0 & 0 & 0 & 0 & 0 \\ h_1 & h_0 & 0 & 0 & 0 \\ h_2 & h_1 & h_0 & 0 & 0 \\ 0 & h_2 & h_1 & h_0 & 0 \\ 0 & 0 & h_2 & h_1 & h_0 \end{pmatrix} \begin{pmatrix} x_0 \\ x_1 \\ x_2 \\ x_3 \\ x_4 \end{pmatrix} \quad \{\text{Expression 2}\}$$

When equations for the respective components are obtained from the transformation matrix of Expression 2, the equations are shown in Expression 3. When these equations are solved to obtain equations for the respective components of the inverse transformation, the series form shown in Expression 4 is obtained.

Here, if it is assumed that the response of the optical sensor unit 9 is an exponential-function response obtained by combining an exponential function that has a short time constant and an exponential function that has a long time constant, the exponential-function response is shown in Expression 5.

$$\begin{aligned} y_0 &= h_0 x_0 \\ y_1 &= h_1 x_0 + h_0 x_1 \\ y_2 &= h_2 x_0 + h_1 x_1 + h_0 x_2 \\ y_3 &= h_2 x_1 + h_1 x_2 + h_0 x_3 \\ y_4 &= h_2 x_2 + h_1 x_3 + h_0 x_4 \end{aligned} \quad \{\text{Expression 3}\}$$

$$\begin{aligned} x_0 &= \frac{1}{h_0} y_0 \\ x_1 &= \frac{1}{h_0} y_1 - \frac{h_1}{h_0^2} y_0 \\ x_2 &= \frac{1}{h_0} y_2 - \frac{h_1}{h_0^2} y_1 + \left[\frac{h_1^2}{h_0^3} - \frac{h_2}{h_0^2}\right] y_0 \end{aligned} \quad \{\text{Expression 4}\}$$

$$h_n = A \cdot \exp(-nk_1) + B \cdot \exp(-nk_2) \quad \{\text{Expression 5}\}$$

Here,
n=0, 1, 2;
$k_1$ and $k_2$ are reciprocal values of the time constants; and
A and B are constants and are normalized so as to satisfy A+B=1.

Accordingly, the coefficients in the inverse transformation shown in Expression 4, i.e., the terms in the inverse transformation matrix, can be rewritten as Expression 6 and Expression 7.

$$\frac{1}{h_0} = \frac{1}{(A+B)} = 1 \quad \{\text{Expression 6}\}$$

$$\frac{h_1}{h_0^2} = h_1 = A \cdot \exp(-k_1) + B \cdot \exp(-k_2) = p$$

$$\left(\frac{h_1^2}{h_0^3} - \frac{h_2}{h_0^2}\right) = h_1^2 - h_2 = (A \cdot \exp(-k_1) + B \cdot \exp(-k_2))^2 - \quad \{\text{Expression 7}\}$$

$$(A \cdot \exp(-2k_1) + B \cdot \exp(-2k_2)) = q$$

Then, if it is assumed that a fast-response component sufficiently attenuates when n=1, $\exp(k_1) = \exp(2k_1) = 0$ is established, and thus, Expression 7 is rewritten as Expression 8.

$$q = B^2 \cdot \exp(-k_2)^2 - B \cdot \exp(-2k_2) = \quad \{\text{Expression 8}\}$$

$$B(B-1) \cdot \exp(-2k_2) = -AB \cdot \exp(-2k_2)$$

Note that Expression 7 and Expression 8 show the first to third terms of the inverse transformation matrix, and the n-th term is generally expressed as in Expression 9.

$$q = -A^{n-1} B \cdot \exp(-2k_2) \quad \{\text{Expression 9}\}$$

Specifically, because the constants A and B are each smaller than 1, the left side of Expression 8 and Expression 9 are sufficiently smaller than 1 and can be considered to be almost zero. More specifically, when the fast-response component sufficiently attenuates, the component for that term is reduced. In a case in which A=B=0.5, convergence is the slowest; however, the component for that term can be rapidly reduced when A=B is set to 0.5, 0.25, or 0.125.

As a result, after passing a point n where the exponential-function response, which is constituted of the two exponential functions, can be considered as a single exponential-function response, the subsequent terms of the inverse transformation become zero. In other words, if there are no terms of n or more, inverse transformation cannot be precisely performed.

Figure 4:
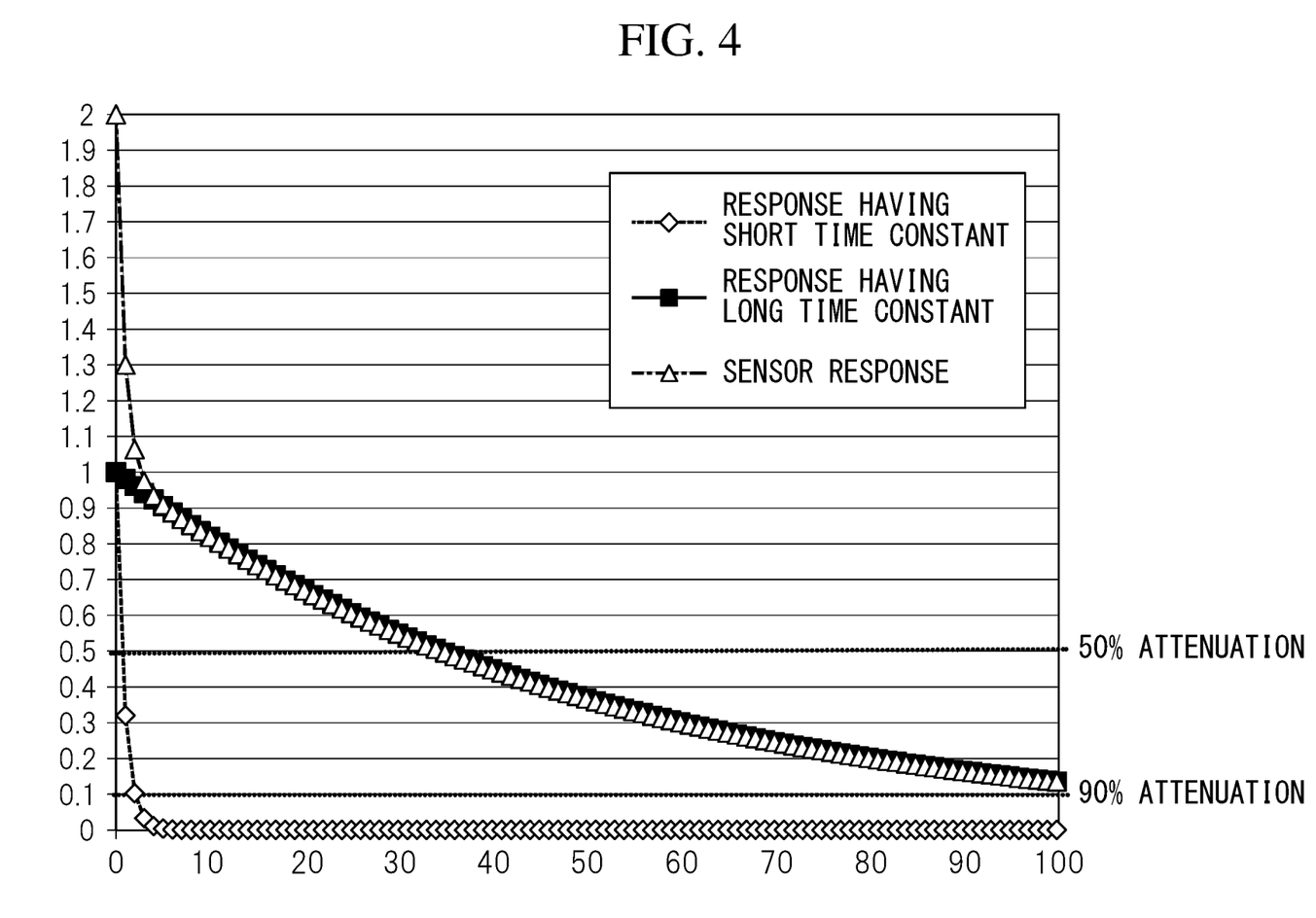
FIG. 4 is a view showing an example sensor response of the optical sensor unit in the optical measurement device shown in FIG. 2.

Here, considering the exponential-function response, which is constituted of the two exponential functions, as a single exponential-function response means that the response of the exponential function that has a shorter time constant attenuates at a predetermined value or more. For example, FIG. 4 shows two exponential-function responses and an exponential-function response obtained by combining these exponential functions. In FIG. 4, the horizontal axis shows the number of sampling points, and the vertical axis shows the amplitude of the exponential-function response.

In FIG. 4, the sampling point where the exponential-function response that has a shorter time constant attenuates by 50% is the second sampling point, and the sampling point where it attenuates by 90% or more is the fourth sampling point. Specifically, in a case in which, after the response of the exponential function that has a shorter time constant attenuates by 50% or more, the response can be considered as a single exponential-function response that has a longer time constant, the number of sampling points is 2, and, by using this, the transformation matrix for the Z-transform is expressed as in Expression 10.

$$\begin{bmatrix} 1 & 0 & 0 \\ p & 1 & 0 \\ 0 & p & 0 \end{bmatrix} \quad \{\text{Expression 10}\}$$

Furthermore, in a case in which, after the response of the exponential function that has a shorter time constant attenuates by 90% or more, the response can be considered as a single exponential-function response that has a longer time constant, the number of sampling points is 4, and, by using this, the transformation matrix for the Z-transform is expressed as in Expression 11.

$$\begin{bmatrix} 1 & 0 & 0 & 0 & 0 & 0 \\ p & 1 & 0 & 0 & 0 & 0 \\ q & p & 1 & 0 & 0 & 0 \\ r & q & p & 1 & 0 & 0 \\ 0 & r & q & p & 1 & 0 \\ 0 & 0 & r & q & p & 1 \end{bmatrix} \quad \{\text{Expression 11}\}$$

Here, $r = -A^2 B \cdot \exp(-3k_2)$

The estimated pulses of the fluorescence, which are output from the calculation unit 11 as a result of the detection, the sampling, and the calculation at the respective scanning positions of the laser light scanned by the scanner 3, are arrayed, by the image reconstruction unit 6, at the coordinates of the scanning positions, thereby generating an image indicating the detected fluorescence levels.

The thus-configured optical measurement device 5 and the optical measurement method of this embodiment use the fact that the optical sensor unit 9 shows an exponential-function response obtained by combining two exponential functions having different time constants (light detection step), acquire waveform information of fluorescence when the A/D conversion unit 10 performs sampling in a sampling period shorter than the longest time constant in the response of the optical sensor unit 9 (A/D conversion step), and calculate an estimated pulse when the calculation unit 11 subjects the acquired waveform information to inverse transformation by using a multiple diagonal matrix (calculation step). Accordingly, even when the response speed of the optical sensor unit 9 is slow, it is possible to perform photon counting without causing temporal signal crosstalk. Then, according to the scanning microscope 1 of this embodiment, there is an advantage in that, even when the response speed of the optical sensor unit 9 is slow, it is possible to observe an image indicating the presence or absence of fluorescence, without causing temporal signal crosstalk.

Note that, in this embodiment, a multiple diagonal matrix (double diagonal matrix) in which the maximum number of non-zero components in each column is 2, as shown in Expression 10, and a multiple diagonal matrix (quad diagonal matrix) in which the maximum number of non-zero components in each column is 4, as shown in Expression 11, are shown as examples of the transformation matrix for the Z-transform.

Figure 5:
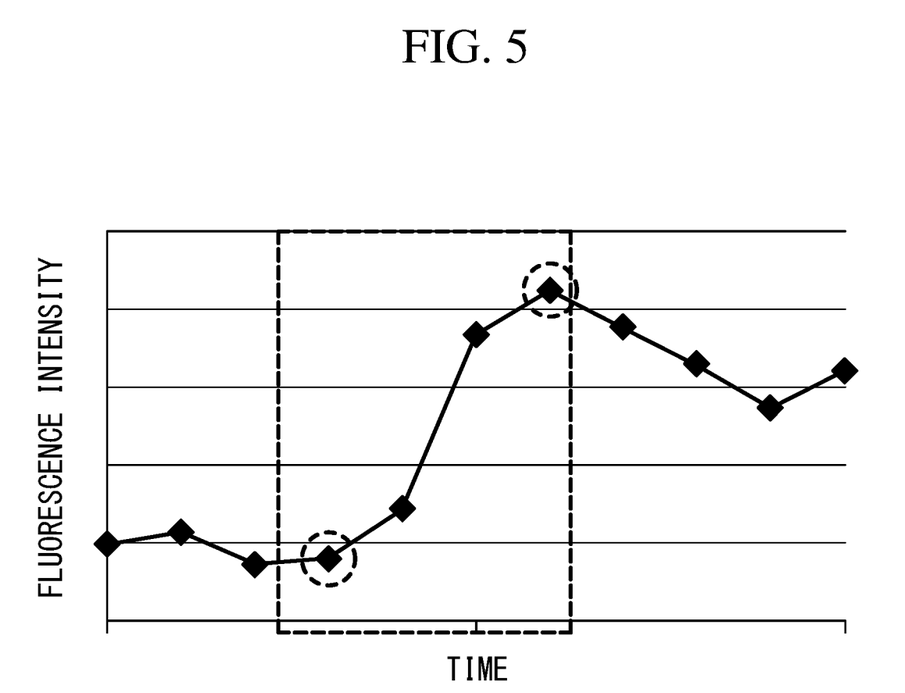
FIG. 5 is a view showing an example sensor response when time is required for rising of an impulse response of the optical sensor unit.

For example, as shown in FIG. 5, if time is required for an impulse response of the optical sensor unit 9 to rise, it is necessary to calculate the difference between fluorescence levels before and after the rising, in order to accurately measure the magnitude of the fluorescence.

As shown in FIG. 5, in a case in which three sampling intervals are required for the rising, when the maximum number of non-zero components in each column is 2, as in Expression 10, it is preferred that a quad diagonal matrix be adopted, as shown in Expression 12. Furthermore, when the maximum number of non-zero components in each column is 4, as in Expression 11, it is preferred that a tenfold diagonal matrix be adopted, as shown in Expression 13.

$$\begin{bmatrix} 1 & 0 & 0 & 0 \\ 0 & 1 & 0 & 0 \\ 0 & 0 & 1 & 0 \\ p & 0 & 0 & 1 \end{bmatrix} \quad \{\text{Expression 12}\}$$

$$\begin{bmatrix} 1 & 0 & 0 & 0 & 0 & 0 & 0 & 0 & 0 & 0 \\ 0 & 1 & 0 & 0 & 0 & 0 & 0 & 0 & 0 & 0 \\ 0 & 0 & 1 & 0 & 0 & 0 & 0 & 0 & 0 & 0 \\ p & 0 & 0 & 1 & 0 & 0 & 0 & 0 & 0 & 0 \\ 0 & p & 0 & 0 & 1 & 0 & 0 & 0 & 0 & 0 \\ 0 & 0 & p & 0 & 0 & 1 & 0 & 0 & 0 & 0 \\ q & 0 & 0 & p & 0 & 0 & 1 & 0 & 0 & 0 \\ 0 & q & 0 & 0 & p & 0 & 0 & 1 & 0 & 0 \\ 0 & 0 & q & 0 & 0 & p & 0 & 0 & 1 & 0 \\ r & 0 & 0 & q & 0 & 0 & p & 0 & 0 & 1 \end{bmatrix} \quad \{\text{Expression 13}\}$$

In these cases, it is preferred that components other than the non-zero component in each column be all zero components.

Furthermore, in this embodiment, although an example case in which the exponential-function response is obtained by combining two exponential functions having different time constants is shown, instead of this, it is also possible to apply the present invention to an ideal case in which the exponential-function response is formed of a single exponential function.

Specifically, if it is assumed that the response of the optical sensor unit 9 is an ideal exponential-function response, the coefficient of the component $y_0$ for the component $x_2$ becomes zero in Expression 4. Specifically, the exponential-function response can be expressed by a geometric progression and includes the relationship in Expression 14 by using the coefficient a of the exponential function, i.e., the time constant of the exponential-function response.

By using this, the transformation matrix for the Z-transform becomes a multiple diagonal matrix shown in Expression 15.

$$x_i - a x_{i-1} = 0 \quad \{\text{Expression 14}\}$$

$$\begin{bmatrix} x_0 \\ x_1 \\ x_2 \\ x_3 \end{bmatrix} = \begin{bmatrix} -a & 0 & 0 & 0 \\ 1 & -a & 0 & 0 \\ 0 & 1 & -a & 0 \\ 0 & 0 & 1 & -a \end{bmatrix} \begin{bmatrix} y_0 \\ y_1 \\ y_2 \\ y_3 \end{bmatrix} \quad \{\text{Expression 15}\}$$

Furthermore, in the optical measurement device 5 of this embodiment, a multiple diagonal matrix (double diagonal matrix) in which the number of multiplications is 2 is shown as an example of the transformation matrix for the Z-transform. Accordingly, it is possible to cope with a case in which rising of the detection signal output from the optical sensor unit 9 is sufficiently fast and to precisely measure an estimated pulse.

Instead of this, it is also possible to adopt a multiple diagonal matrix in which the number of multiplications is 3 or more. For example, as shown in FIG. 5, if time is required for an impulse response of the optical sensor unit 9 to rise, it is necessary to calculate the difference between fluorescence levels before and after the rising, in order to accurately measure the magnitude of the fluorescence.

As shown in FIG. 5, in a case in which three sampling intervals are required for the rising, it is preferred that a quad diagonal matrix be adopted, as shown in Expression 16. In a multiple diagonal matrix, if the number of multiplications is an odd number, the matrix is expressed by either an upper multiple matrix in which non-zero terms are located above diagonal components or a lower multiple matrix in which non-zero terms are located below diagonal components. When the rising is sufficiently fast, it is preferred that an upper double diagonal matrix or a lower double diagonal matrix be adopted.

$$\begin{bmatrix} x_0 \\ x_1 \\ x_2 \\ x_3 \end{bmatrix} = \begin{bmatrix} -a & 0 & 0 & 0 \\ 0 & -a & 0 & 0 \\ 0 & 0 & -a & 0 \\ 1 & 0 & 0 & -o \end{bmatrix} \begin{bmatrix} y_0 \\ y_1 \\ y_2 \\ y_3 \end{bmatrix} \quad \{\text{Expression 16}\}$$

Figure 6:
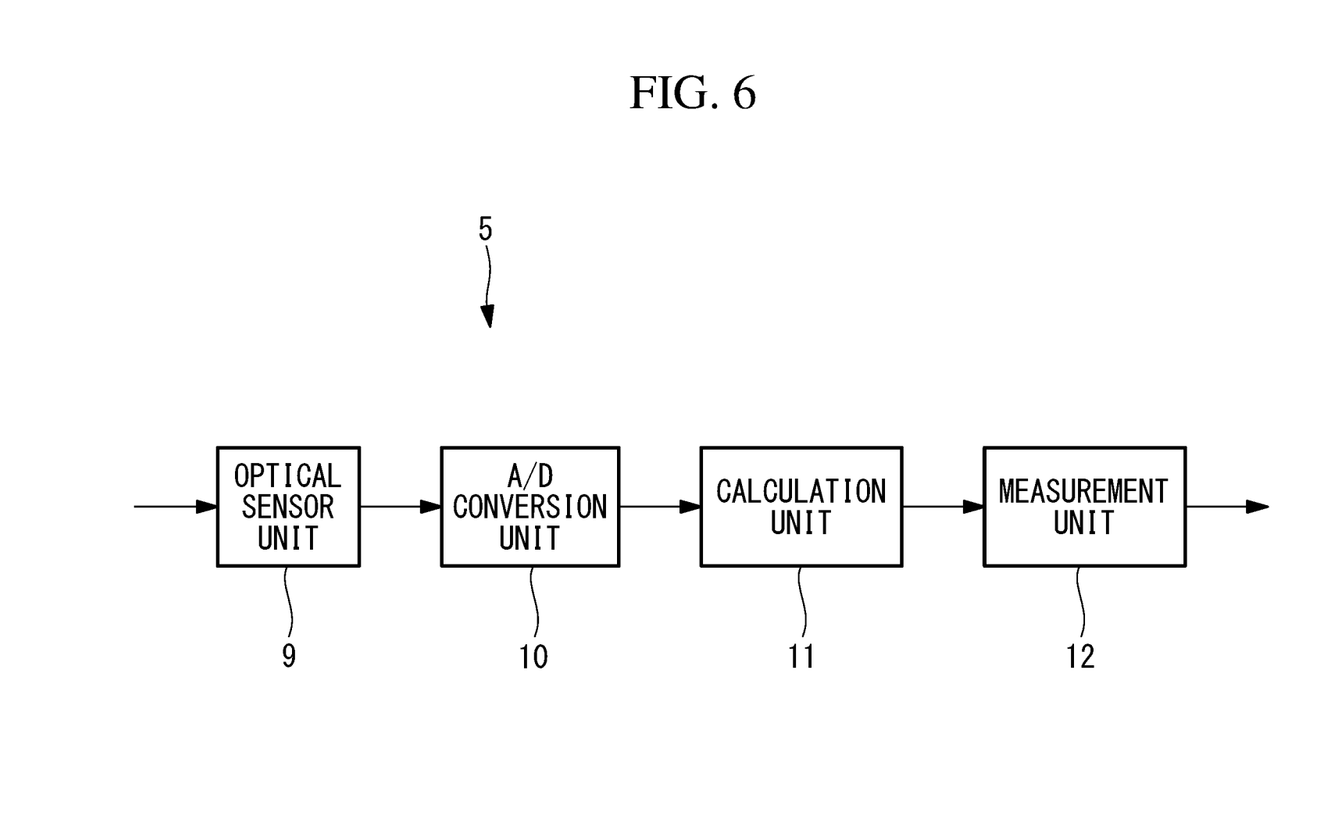
FIG. 6 is a block diagram showing a modification of the optical measurement device shown in FIG. 2.

Furthermore, in the scanning microscope 1 of this embodiment, although the image reconstruction unit 6 generates an image that includes signal intensities that correspond to fluorescence levels detected at the respective pixels and that are output from the optical sensor unit 9, instead of this, it is also possible to generate an image that has the number of detected photons detected by the optical sensor unit 9. In this case, as shown in FIG. 6, the optical measurement device 5 needs to include a measurement unit 12 that measures the magnitude of the estimated pulse, which is output from the calculation unit 11, through threshold processing.

For example, when the estimated pulse is equal to or greater than a predetermined threshold and is less than two times the predetermined threshold, the measurement unit 12 can measure the magnitude of the estimated pulse by determining that the estimated pulse is fluorescence for 1 photon, and, when the estimated pulse is equal to or greater than two times the predetermined threshold and is less than three times the predetermined threshold, the measurement unit 12 can measure the magnitude of the estimated pulse by determining that the estimated pulse is fluorescence for 2 photons. More specifically, information on the magnitude of the estimated pulse can be measured by dividing the integration signal by the area of a unit pulse. By arraying the information on the magnitudes of the estimated pulses, which are measured by the measurement unit 12, in association with scanning positions, an image indicating the fluorescence intensities can be generated.

Furthermore, the measurement unit 12 may also perform measurement by integrating detection signals output from the calculation unit 11, over a predetermined period of time, thereby summing the number of photons within the integration period. Accordingly, high quantitativity can be obtained with respect to the measurement of the number of photons, and there is an advantage in that precise measurement can be performed by reducing the effect of noise. When the present invention is applied to the scanning microscope 1, the integration time is made to correspond to an exposure time.

Furthermore, the measurement unit 12 may also perform the integration over the same period of time as the period of time corresponding to the number of multiplications of a multiple diagonal matrix. With this configuration, there is an advantage in that it is possible to obtain high quantitativity in addition to high temporal resolution.

Furthermore, it is also possible for the measurement unit 12 to determine a detection area by detecting rising and falling of an estimated pulse through threshold processing and to integrate the estimated pulse in the determined detection area. With this configuration, there is an advantage in that it is possible to dynamically change the timing and the period of time of the integration, to prevent the detection signal from overlapping the exposure time, and to obtain higher measurement performance.

Furthermore, in the optical measurement device 5 of this embodiment, although the time constant of the exponential-function response of the optical sensor unit 9 is used as a diagonal component, instead of this, it is also possible to set all non-zero components of the multiple diagonal matrix to 1 or −1. With this configuration, because the inverse transformation based on the Z-transform is approximated as a simple difference, the magnitude of an estimated pulse to be output varies to some degree; however, detection of the magnitude of an estimated pulse performed depending on the presence or absence of fluorescence or through threshold processing is sufficiently feasible and practical. Accordingly, there is an advantage in that implementation is allowed with even less device resources.

Furthermore, in the optical measurement device 5 of this embodiment, although the light source unit 2, which generates ultrashort-pulse laser light, is shown as an example, instead of this, it is also possible to use a light source unit that generates continuous laser light (for example, CW laser).

Furthermore, although an example scanning microscope that images fluorescence intensity is shown as the scanning microscope 1 of this embodiment, instead of this, the present invention may also be applied to a scanning microscope that images fluorescence lifetime.

As a result, the above-described embodiment leads to the following aspects.

One aspect of the present invention is directed to an optical measurement device including: an optical sensor unit that detects pulsed signal light and that outputs a detection signal formed of an exponential-function response; an A/D conversion unit that samples the detection signal output from the optical sensor unit and that converts the detection signal into a digital signal; and a calculation unit that subjects the digital signal output from the A/D conversion unit to inverse transformation by using a multiple diagonal matrix, thus calculating an estimated pulse of the signal light.

According to this aspect, when pulsed signal light is detected by the optical sensor unit, a detection signal that is formed of an exponential-function response is output from the optical sensor unit and is sampled and converted into a digital signal by the A/D conversion unit. The digital signal output from the A/D conversion unit is subjected to inverse transformation using a multiple diagonal matrix, in the calculation unit, and an estimated pulse of the signal light is calculated therein. Accordingly, when an optical sensor unit that shows an exponential-function response is used, even if the response speed of the optical sensor unit is slow, photon counting can be performed without causing temporal signal crosstalk.

In the above-described aspect, the detection signal from the optical sensor unit may be formed of an exponential-function response obtained by combining two or more exponential functions; the A/D conversion unit may sample the detection signal in a sampling period shorter than a longest time constant in the exponential functions that constitute the exponential-function response; and the multiple diagonal matrix may have one or more non-zero components in each column.

With this configuration, the exponential-function response is more precisely approximated, thus making it possible to precisely perform photon counting.

Furthermore, in the above-described aspect, a maximum number of the one or more non-zero components in each column may be greater than a number of samplings performed by the A/D conversion unit, the number of samplings corresponding to a period of time in which the exponential-function response can be regarded as a single exponential function.

Furthermore, in the above-described aspect, the maximum number of the one or more non-zero components in each column may be 2.

With this configuration, when rising of the optical sensor is sufficiently fast, photon counting can be precisely performed with a small amount of calculation. Furthermore, two or more exponential-function responses are approximately calculated, thereby making it possible to simplify the processing.

Furthermore, in the above-described aspect, the non-zero components in each column that includes a plurality of the non-zero components may be arrayed at fixed intervals equal to or less than a number of samplings corresponding to a rising time of the optical sensor unit, and a zero component may be arrayed between the respective non-zero components.

With this configuration, rising of the response of the optical sensor can be accurately obtained.

In the above-described aspect, the detection signal from the optical sensor unit may be formed of an exponential-function response constituted of a single exponential function; the A/D conversion unit may sample the detection signal in a sampling period shorter than the time constant of the exponential-function response; and a maximum number of non-zero components in each column may be 2.

With this configuration, waveform information of the optical signal can be obtained.

In the above-described aspect, the multiple diagonal matrix may have a number of multiplications equal to or less than a number of samplings corresponding to a rising time of the optical sensor unit.

With this configuration, rising of the sensor response can be accurately obtained.

Furthermore, in the above-described aspect, the non-zero components of the multiple diagonal matrix may each be 1 or −1.

Furthermore, in the above-described aspect, the multiple diagonal matrix may be an upper double diagonal matrix or a lower double diagonal matrix.

Furthermore, the above-described aspect may further include a measurement unit that measures a magnitude of the estimated pulse output from the calculation unit, through threshold processing.

With this configuration, the height of the estimated pulse that has been subjected to inverse transformation is subjected to threshold processing, thereby making it possible to measure the number of photons detected by the optical sensor unit.

Furthermore, the above-described aspect may further include a measurement unit that integrates the estimated pulse output from the calculation unit and that measures a magnitude of the integrated estimated pulse through threshold processing.

With this configuration, the number of photons can be precisely quantitated by reducing the effect of noise, etc.

Furthermore, in the above-described aspect, the measurement unit may integrate the estimated pulse a same number of times as a number of multiplications of the multiple diagonal matrix.

With this configuration, the number of photons can be precisely quantitated by reducing the effect of noise, etc., with the shortest integration time.

Furthermore, in the above-described aspect, the measurement unit may determine a detection area by detecting rising and falling of the estimated pulse through threshold processing and may integrate the estimated pulse in the determined detection area.

With this configuration, the integration timing and the integration time are dynamically changed, thereby making it possible to prevent the signal from overlapping the exposure time, and to obtain higher measurement performance.

Furthermore, in the above-described aspect, the optical sensor unit may include a semiconductor optical sensor formed by arraying a plurality of avalanche photodiodes that are operated in a Geiger mode.

With this configuration, by using an inexpensive and sensitive semiconductor optical sensor, it is possible to perform photon counting without causing temporal signal crosstalk.

Another aspect of the present invention is directed to an optical measurement method including: detecting pulsed signal light by means of a semiconductor optical sensor and outputting a detection signal formed of an exponential-function response; sampling the output detection signal and converting the detection signal into a digital signal; and calculating an estimated pulse of the signal light by subjecting the digital signal, which is obtained through the conversion, to inverse transformation by using a multiple diagonal matrix.

Another aspect of the present invention is directed to a scanning microscope including: a scanning unit that scans, on a sample, illumination light emitted from a light source; an optical system that focuses, on the sample, the illumination light scanned by the scanning unit and that collects the signal light generated at each scanning position in the sample, at which the illumination light is scanned; one of the above-described optical measurement devices that calculate the estimated pulse of the signal light collected by the optical system; and an image reconstruction unit that reconstructs an image of the sample on a basis of the estimated pulse calculated by the optical measurement device.

According to the present invention, an advantageous effect is afforded in that photon counting can be performed without causing temporal signal crosstalk even when an optical sensor that has a long response time is used.

REFERENCE SIGNS LIST 1 scanning microscope
2 light source unit (light source)
3 scanner (scanning unit)
4 optical system 5 optical measurement device
6 image reconstruction unit
9 optical sensor unit
10 A/D conversion unit
11 calculation unit
12 measurement unit
X sample

The invention claimed is:

1. A scanning microscope comprising:
a scanner that scans, on a sample, illumination light emitted from a light source;
an optical system that focuses, on the sample, the illumination light scanned by the scanner and that collects signal light generated at each scanning position in the sample, at which the illumination light is scanned;
an optical measurement device that calculates an estimated pulse of the signal light collected by the optical system; and
an image reconstruction unit that reconstructs an image of the sample on a basis of the estimated pulse calculated by the optical measurement device,
the optical measurement device comprising:
an optical sensor that detects pulsed signal light and that outputs a detection signal formed of an exponential-function response;
an A/D converter that samples the detection signal output from the optical sensor and that converts the detection signal into a digital signal; and
a processor comprising hardware, the processor being configured to subject the digital signal output from the A/D converter to inverse transformation by using a multiple diagonal matrix, thus calculating the estimated pulse of the signal light.

2. The scanning microscope according to claim 1,
wherein the detection signal from the optical sensor is formed of an exponential-function response obtained by combining two or more exponential functions;
the A/D converter samples the detection signal in a sampling period shorter than a longest time constant in the exponential functions that constitute the exponential-function response; and
the multiple diagonal matrix has one or more non-zero components in each column.

3. The scanning microscope according to claim 2, wherein a maximum number of the one or more non-zero components in each column is greater than a number of samplings performed by the A/D converter, the number of samplings corresponding to a period of time in which the exponential-function response can be regarded as a single exponential function.

4. The scanning microscope according to claim 3, wherein the non-zero components in each column that includes a plurality of the non-zero components are arrayed at fixed intervals equal to or less than a number of samplings corresponding to a rising time of the optical sensor unit, and a zero component is arrayed between the respective non-zero components.

5. The scanning microscope according to claim 2, wherein the maximum number of the one or more non-zero components in each column is 2.

6. The scanning microscope according to claim 5, wherein the non-zero components in each column that includes a plurality of the non-zero components are arrayed at fixed intervals equal to or less than a number of samplings corresponding to a rising time of the optical sensor unit, and a zero component is arrayed between the respective non-zero components.

7. The scanning microscope according to claim 1,
wherein the detection signal from the optical sensor is formed of an exponential-function response constituted of a single exponential function;
the A/D converter samples the detection signal in a sampling period shorter than the time constant of the exponential-function response; and
a maximum number of non-zero components in each column is 2.

8. The scanning microscope according to claim 7, wherein the multiple diagonal matrix has a number of multiplications equal to or less than a number of samplings corresponding to a rising time of the optical sensor.

9. The scanning microscope according to claim 8, wherein the non-zero components of the multiple diagonal matrix are each 1 or −1.

10. The scanning microscope according to claim 9, wherein the multiple diagonal matrix is an upper double diagonal matrix or a lower double diagonal matrix.

11. The scanning microscope according to claim 1, wherein the processor is further configured to measure a magnitude of the estimated pulse output through threshold processing.

12. The scanning microscope according to claim 1, wherein the processor is further configured to integrate the estimated pulse output and measure a magnitude of the integrated estimated pulse through threshold processing.

13. The scanning microscope according to claim 12, wherein the measurement of the magnitude of the integrated estimated pulse integrates the estimated pulse a same number of times as a number of multiplications of the multiple diagonal matrix.

14. The scanning microscope according to claim 12, wherein the measurement of the magnitude of the integrated estimated pulse determines a detection area by detecting rising and falling of the estimated pulse through threshold processing and integrates the estimated pulse in the determined detection area.

15. The scanning microscope according to claim 1, wherein the optical sensor comprises a semiconductor optical sensor formed by arraying a plurality of avalanche photodiodes that are operated in a Geiger mode.

16. A microscope comprising:
an optical system that collects, on a sample, illumination light emitted from a light source and that collects a signal light generated at the sample;
an optical measurement device that calculates an estimated pulse of the signal light collected by the optical system; and
an image reconstruction unit that reconstructs an image of the sample on a basis of the estimated pulse calculated by the optical measurement device,
the optical measurement device comprising:
an optical sensor that detects pulsed signal light and that outputs a detection signal formed of an exponential function response;
an A/D converter that samples the detection signal output from the optical sensor and that converts the detection signal into a digital signal; and
a processor comprising hardware, the processor being configured to subject the digital signal output from the A/D converter to inverse transformation by using a multiple diagonal matrix, thus calculating the estimated pulse of the signal light.

17. The microscope according to claim 16, wherein the processor is further configured to measure a magnitude of the estimated pulse output through threshold processing.

18. The microscope according to claim 16, wherein the processor is further configured to integrate the estimated pulse output and measure a magnitude of the integrated estimated pulse through threshold processing.

19. The microscope according to claim 16, wherein the optical sensor comprises a semiconductor optical sensor formed by arraying a plurality of avalanche photodiodes that are operated in a Geiger mode.

* * * * *